United States Patent [19]

Wada et al.

[11] Patent Number: 5,072,965
[45] Date of Patent: Dec. 17, 1991

[54] SUSPENSION CONTROL DEVICE

[75] Inventors: Shunichi Wada; Shigeki Ohtagaki, both of Hyogo, Japan

[73] Assignee: Mitsubishi Denki K.K., Tokyo, Japan

[21] Appl. No.: 530,526

[22] Filed: May 30, 1990

[30] Foreign Application Priority Data

May 31, 1989 [JP] Japan .................................. 1-137959
May 31, 1989 [JP] Japan .................................. 1-137960

[51] Int. Cl.$^5$ ............................................. B60G 17/00
[52] U.S. Cl. ................................ 280/707; 364/424.05
[58] Field of Search ............... 280/707, 724, 714, 688, 280/702, 703; 364/424.05

[56] References Cited

U.S. PATENT DOCUMENTS

| | | | |
|---|---|---|---|
| 4,696,489 | 9/1987 | Fujishiro et al. | 280/703 |
| 4,729,580 | 3/1988 | Buma et al. | 280/707 |
| 4,741,554 | 5/1988 | Okamoto | 280/703 |
| 4,765,648 | 8/1988 | Mander et al. | 280/707 |
| 4,787,650 | 11/1988 | Doi et al. | 280/707 |

FOREIGN PATENT DOCUMENTS

| | | |
|---|---|---|
| 0246772 | 11/1987 | European Pat. Off. . |
| 0255720 | 2/1988 | European Pat. Off. . |
| 0269132 | 6/1988 | European Pat. Off. . |
| 59-227515 | 12/1984 | Japan . |
| 206710 | 10/1985 | Japan ................................ 280/707 |
| 106720 | 4/1989 | Japan ................................ 280/707 |
| 2211153 | 6/1989 | United Kingdom . |

Primary Examiner—Kenneth R. Rice
Assistant Examiner—Tamara L. Finlay
Attorney, Agent, or Firm—Sughrue, Mion, Zinn, Macpeak & Seas

[57] ABSTRACT

A suspension control device including a control device for variably controlling a damping force of a suspension to an optimum value by determining a magnitude of acceleration is vertical opposite directions of a vehicle body which magnitude is equal to or greater than a predetermined level and measuring the accumulated duration time of a sprung resonance which is detected by a cycle of vibration of the vehicle body from a timing of the determination of the magnitude. In another aspect, the suspension control device includes a control device for outputting a command for increasing a damping force when a magnitude of acceleration in vertical opposite directions of a vehicle body is determined to be equal to or greater than a predetermined level, and measuring the number of repetitions of a sprung resonance which is detected by measuring a cycle of vibration of the vehicle body from a timing of the determination of the magnitude. The control device maintains the damping force at a high level until the vehicle is stopped and a door open condition is detected.

2 Claims, 8 Drawing Sheets

SUSPENSION CONTROL DEVICE

BACKGROUND OF THE INVENTION

1. Field of the Invention

The present invention relates to a suspension control device which suppresses resonance due to sprung vibration of a suspension of an automobile.

2. Description of the Prior Art

Figure 8:
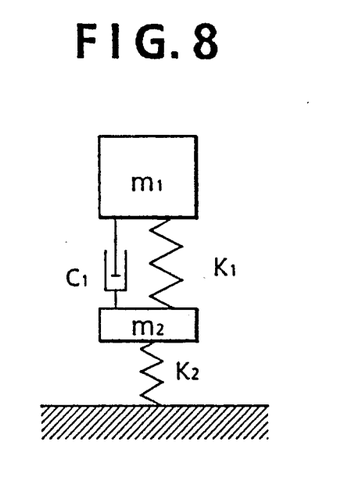
FIG. 8 is a schematic illustration of an equivalent vibration model of an automobile.

Generally, a vibration model of an automobile as shown in FIG. 8 which is an equivalent model is represented by a vibration having two degrees of freedom such that a mass m1 of a vehicle body (sprung member) is supported by a spring (spring constant: k1) and a damper (damping coefficient: c1) as suspension means, and a mass m2 of an unsprung member such as a wheel is supported by a spring (tire) (spring constant: k2).

Figure 9:
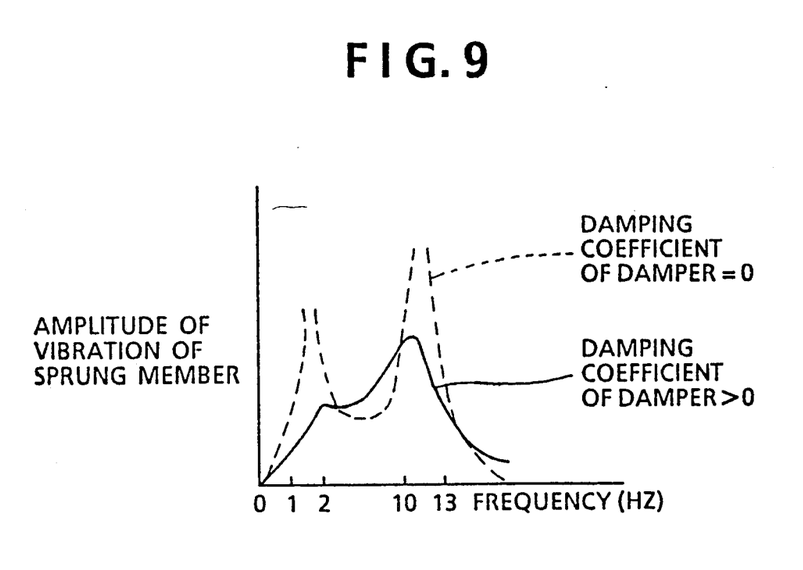
FIG. 9 is a characteristic graph showing a vibration characteristic of the sprung member.

In such a vibration model, the vibration of the sprung member due to stimulus from a road surface has two resonance points as shown in FIG. 9. One of the two resonance points is a sprung resonance point due to resonance of the sprung member having a frequency of about 1.5-2 Hz, while the other point is an unsprung resonance point due to resonance of the unsprung member having a frequency of about 10-13 Hz.

As apparent from FIG. 9, it is appreciated that an amplitude of the vibration of the sprung member at the above resonance points can be reduced to improve driving comfort by increasing a damping force of the suspension means (the damping coefficient c1 of the damper).

However, when the damping force of the suspension means is increased, a stiff shock is transmitted to the vehicle body at any points other than the resonance points, thus rather reducing driving comfort.

To cope with this problem, there has been proposed a technique such that the damping force of the suspension means is made variable, and when a frequency of the vibration falls in a spring or unsprung resonance frequency region, the damping force is temporarily increased to thereby effectively suppress the vibration of the vehicle body throughout the whole frequency region (cf. Japanese Patent Laid-open Publication No. 59-227515).

Generally, damping of the sprung resonance depends on a damping coefficient ratio $\zeta = c_1^{\frac{1}{2}} m_1 k_1$, and the more the damping coefficient ratio approaches 1, the more the sprung resonance is suppressed. However, the damping coefficient ration is normally set to 0.2-0.3 in consideration of driving comfort in any regions other than the resonance frequency.

When the sprung weight m1 is increased by an increase in passengers or luggage, the damping coefficient ration $\zeta$ is relatively reduced. As a result, the damping of the sprung member becomes weak to increase the duration of the vibration and accordingly reduce vehicle's driving comfort.

Although the sprung resonance can be suppressed by detecting the same and temporarily increasing the damping force to increase the damping coefficient ratio, the sprung resonance is easily generated when an original damping force is restored.

SUMMARY OF THE INVENTION

The present invention is achieved to solve the above-mentioned problem, and it is an object of the present invention to provide a suspension control device which can suppress the sprung resonance to improve driving comfort by maintaining a damping force at a high level until an automobile is stopped and a load such as passengers or luggage is changed in the event that the sprung resonance is easily generated because of an increase in sprung weight, and also can prevent a reduction in running stability due to the increase in sprung weight.

The suspension control device according to one aspect of the present invention is provided with control means for variably controlling a damping force of a suspension to an optimum value by determining a magnitude of acceleration in vertical opposite directions of a vehicle body which magnitude is equal to or greater than a predetermined level and measuring a cycle of vibration of the vehicle body from a timing of the determination of the magnitude.

With this construction, a cycle of sprung resonance is measured from a timing when an output signal from the acceleration detecting means becomes a level equal to or greater than a predetermined level, and if an accumulated duration time of the sprung resonance is equal to or greater than a predetermined time, the damping force is set to a high level. Accordingly, in the case that a sprung weight of the vehicle is increased by an increase in passengers or luggage, and a damping coefficient ratio is relatively reduced to cause easy occurrence of the spring resonance, the occurrence of the sprung resonance is detected according to vertical acceleration of the vehicle body to vary the damping force to a high level, thereby suppressing the sprung resonance and improving driving comfort.

Furthermore, once the damping force is set to the high level, the high damping force is maintained until a load on the vehicle such as passengers or luggage is changed. Accordingly, the sprung resonance during running due to an increase in the sprung weight can be reduced at all times to thereby improve driving comfort. Simultaneously, a reduction in running stability due to an increase in the sprung weight can be prevented by suitably increasing the damping force.

The suspension control device according to another aspect of the present invention is provided with control means for outputting a command for increasing a damping force when a magnitude of acceleration in vertical opposite directions of a vehicle body is determined to be equal to or greater than a predetermined level and measuring a cycle of vibration of the vehicle body from a timing of the determination of the magnitude, which is similar to the control device according to the first aspect of the present invention.

However, with this construction, a cycle of spring resonance is measured from a timing when an output signal from the acceleration detecting means becomes a level equal to or greater than a predetermined level, and if the number of repetitions of the sprung resonance having the above cycle becomes a predetermined value, the damping force varying means is controlled by the control means so as to vary the damping force to an optimum value. Accordingly, in the case that a sprung weight of the vehicle is increased by an increase in passengers or luggage, and a damping coefficient ratio is relatively reduced to cause easy occurrence of the spring resonance, the occurrence of the sprung resonance is detected according to vertical acceleration of the vehicle body to vary the damping force to a high level, thereby suppressing the sprung resonance and improving driving comfort.

3

Other objects and features of the invention will be more fully understood from the following detailed description and appended claims when taken with the accompanying drawings.

DETAILED DESCRIPTION OF THE PREFERRED EMBODIMENTS

Figure 1:
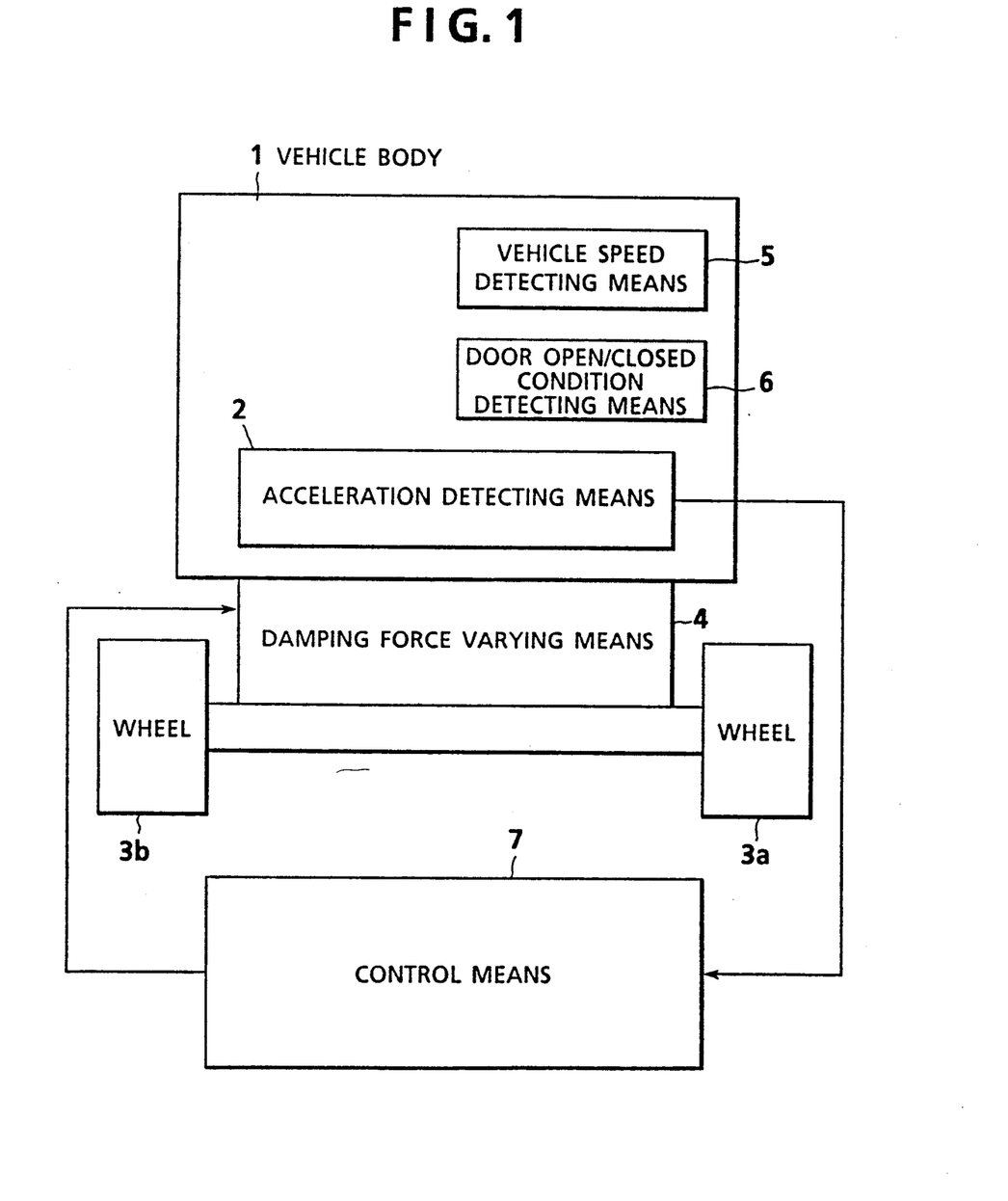
FIG. 1 is a block diagram showing a basic construction of the suspension control device according to the present invention.

There will now be described some preferred embodiments of the present invention with reference to the drawings. FIG. 1 is a block diagram showing a basic construction according to the present invention.

The suspension control device according to a first preferred embodiment of the present invention is basically constructed of acceleration detecting means 2 for detecting acceleration in vertical opposite directions of a vehicle body 1, damping force varying means 4 for varying a damping force of a shock absorber provided between each of wheels 3a and 3b and the vehicle body 1 according to an external command, vehicle speed detecting means 5, door open/closed condition detecting means 6 for detecting an open or closed condition of doors, and control means 7 for outputting to the damping force varying means 4 a command for varying the damping force to a desired value according to a result of detection of spring resonance to be obtained by determining a magnitude of the vertical acceleration and a cycle of vibration and according to a result of measurement of anaccumulated duration time of the sprung resonance, and for outputting to the damping force varying means 4 a command for maintaining the damping force at a high level until a stoppage of the vehicle and a change in load such as passengers or luggage are estimated according to an output signal from a vehicle speed counter (not shown) for counting an output from the vehicle speed detecting means 5 and according to an output signal from the door open/closed condition detecting means 6.

4

Figure 2:
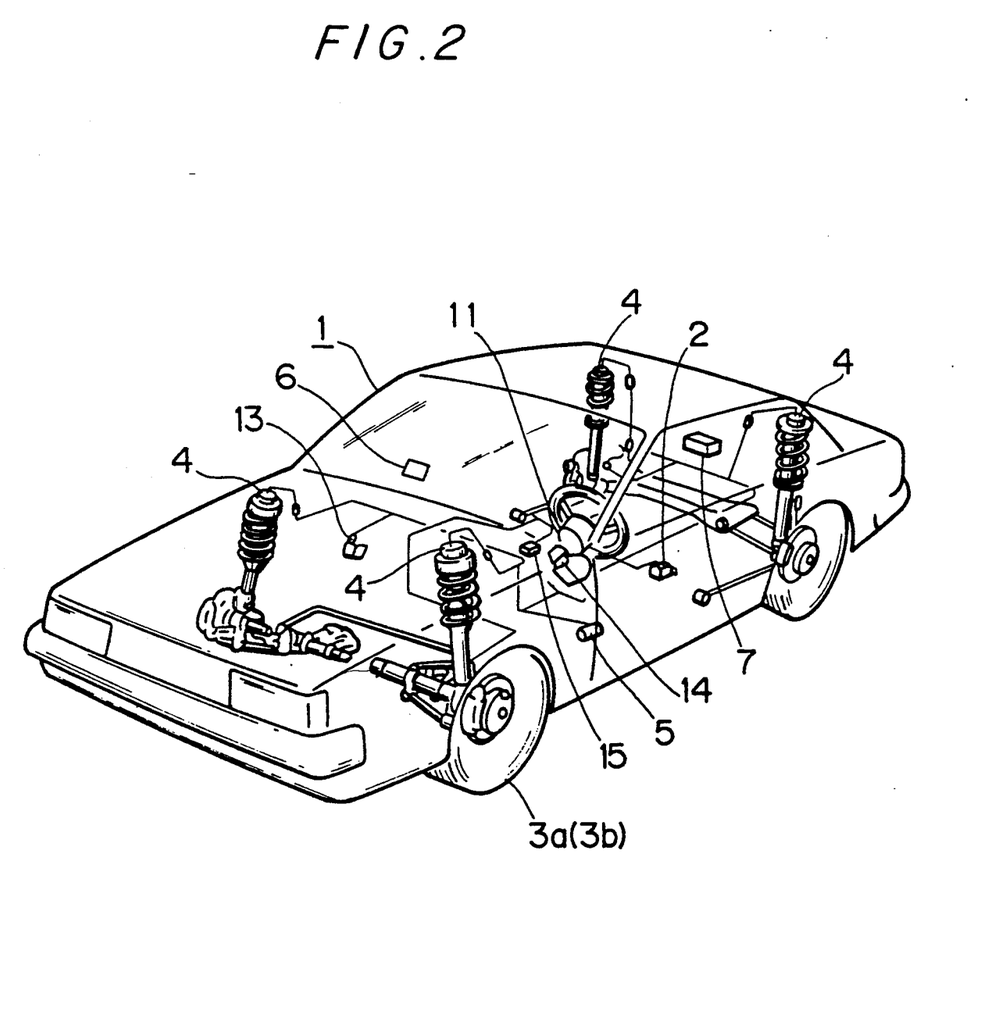
FIG. 2 is a perspective view of the suspension control device mounted on the vehicle.
Figure 3:
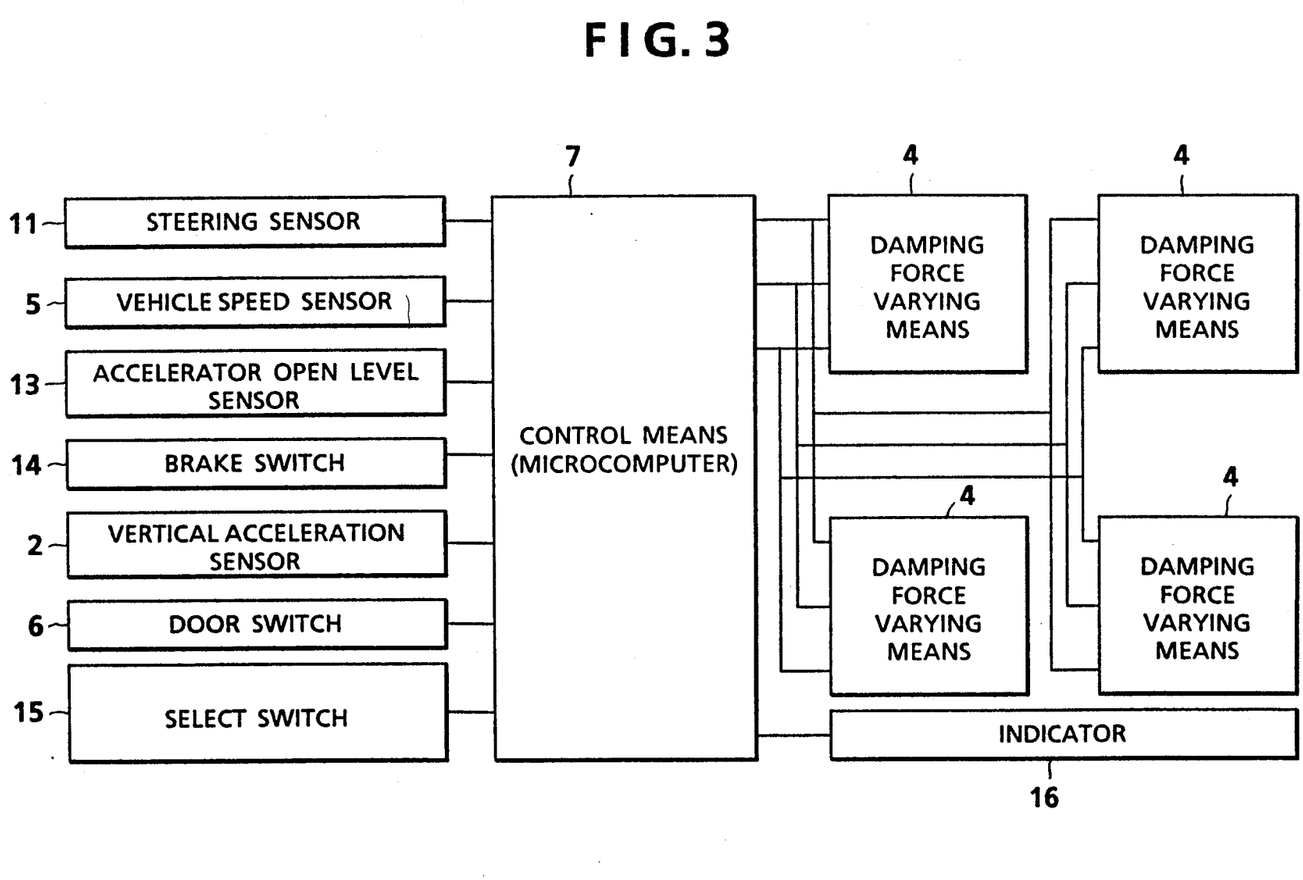
FIG. 3 is a block diagram showing the construction of FIG. 2.

FIG. 2 is a perspective view of the preferred embodiment mounted on the vehicle, and FIG. 3 is a block diagram showing the construction of FIG. 2.

Referring to FIGS. 2 and 3, reference numeral 11 designates a steering sensor for detecting an operating condition of a steering wheel; 5 a vehicle speed sensor as the vehicle speed detecting means; 13 an accelerator opening sensor for detecting accelerative or decelerative operation of the vehicle body 1; 14 a brake switch; 6 a door switch as the door open/closed condition detecting means; 2 a vertical acceleration sensor as the acceleration detecting means; 5 a select switch; and 16 an indicator.

The vertical acceleration sensor 2 detects vertical acceleration of the vehicle body 1, and it is selected from an acceleration pickup constructed of a piezoelectric body or various automotive acceleration sensors of a differential transducer type or a semiconductor strain gauge type.

Although the vertical acceleration sensor 2 is located at the center of gravity of the vehicle body 1 in the preferred embodiment, it may be located at a front position of the vehicle body 1, or at both the front and rear positions of the vehicle body, or at every suspension for the wheels.

The vertical acceleration sensors 2 linearly outputs an analog voltage signal corresponding to the vertical acceleration with a reference output level defined at zero acceleration.

As shown in FIG. 3, outputs from the steering sensor 11, the vehicle speed sensor 5, the accelerator opening sensor 13, the brake switch 14, the vertical acceleration sensor 2, the door switch 6 and the select switch 15 are inputted to the control means 7.

The control means 7 variably controls the damping force of the damping force varying means 4, and also drives the indicator 16 to indicate the controlled damping force, the vehicle speed, the open/closed condition of the door switch 6, the open/closed condition of the brake switch 14, the information of the select switch 15, the information of the steering sensor 11 and the information of the accelerator opening sensor 13.

In operation, the analog output from the vertical acceleration sensor 2 is converted into a digital signal, which is in turn inputted to the control means 7 constructed of a microcomputer. In the control means 7, a signal level of the output from the vertical acceleration sensor 2 and a cycle of vibration are computed.

Figure 4:
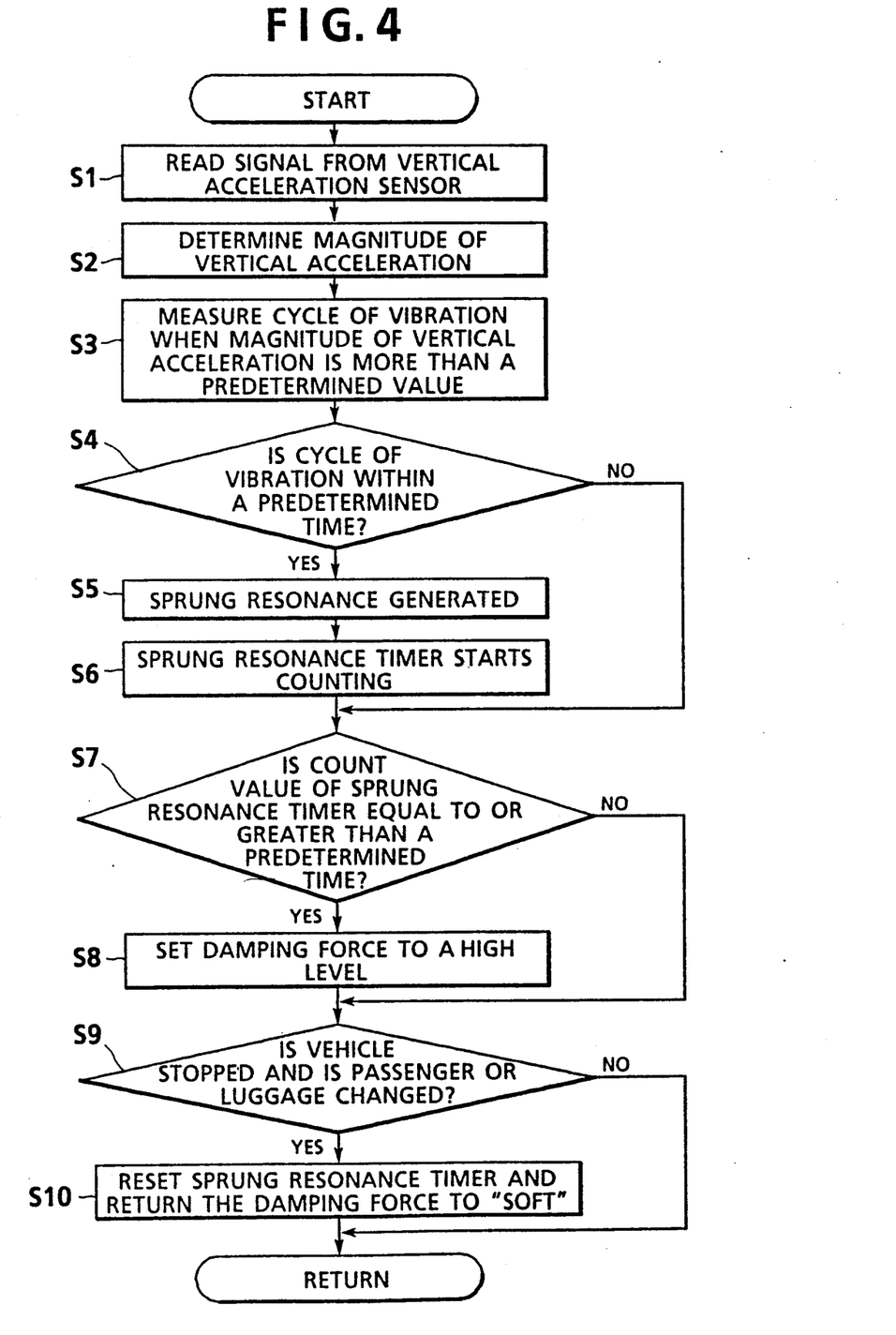
FIG. 4 is a flowchart showing the procedure of control operation by the control means according to a first preferred embodiment of the present invention.

The procedure of control operation by the control means 7 according to the first aspect of the present invention will now be described with reference to the flowchart shown in FIG. 4.

First of all, it is assumed that the vehicle is cruising at a "SOFT" damping stage in consideration of the comfortability, and then after the program is started, a signal from the vertical acceleration sensor 2 is read in step S1, and a magnitude of the acceleration in vertical opposite directions which magnitude is equal to or greater than a predetermined level with reference to a reference value ($\pm 0$ G (acceleration)) of the signal is detected in step S2.

Then, a cycle of the vibration is measured from a timing where the magnitude of the acceleration is determined as a full or half cycle in step S3.

In step S4, it is judged whether or not the cycle of the vibration is within a predetermined time according to the results of steps S2 and S3. If the answer is YES, the program proceeds to step S5 and it is judged that the sprung resonance is generated, and then proceeds to step S6, in which a sprung resonance timer is started to count a duration time of the sprung resonance.

Then, the program proceeds to step S7, in which a count value of the sprung resonance timer is determined. If the count value is equal to or greater than a predetermined value, that is, if an accumulated value of the duration time of the sprung resonances is equal to or greater than a predetermined time, the program proceeds to step S8, in which a damping force is set to a high level. Then, the program proceeds to step S9.

Meanwhile, in the above step S4, if the answer is NO, then the program proceeds to step S7, in which the above processing is executed.

If it is judged in step S7 that the accumulated value of the duration time of the sprung resonance is less than the predetermined time, the program proceeds to step S9.

In step S9, it is judged whether or not a load on the vehicle such as passengers or luggage is changed. That is, if the vehicle speed sensor 5 detects a zero speed to determine the stoppage of the vehicle and the door switch 6 detects a door open condition, it is judged that the passenger or luggage is changed, and the program proceeds to step S10.

In step S10, the sprung resonance timer is reset, and the damping force is returned to an original value corresponding to the "SOFT" position if the damping force is currently maintained at the high level.

If the answer in step S9 is NO, that is, if no change in passengers or luggage occurs, the current condition is not changed, that is, the program skips the step S10 and proceeds to the next step.

Figure 6:
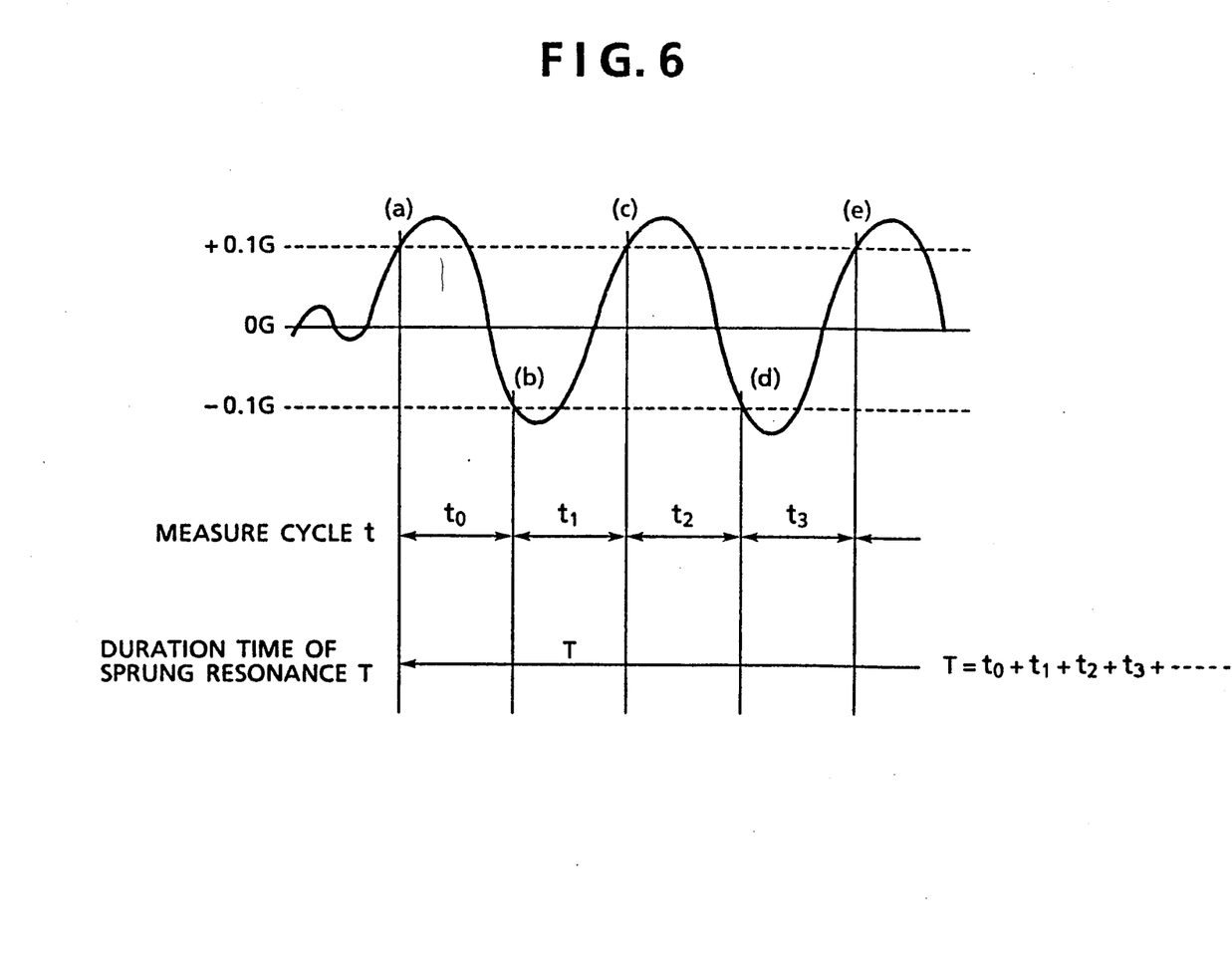
FIG. 6 is a characteristic graph showing an example of how to measure a cycle of vibration and detect the accumulated duration time from a timing of the determination of the magnitude according to the first preferred embodiment as shown in FIG. 4.

The above procedures can be more clearly understood if explained referring to FIG. 6.

In FIG. 6, the period t is measured at a start timing (a) when the vertical acceleration exceeds $+0.1$ G. If a half cycle (t0) from the start timing (a) to a timing (b) when the vertical acceleration exceeds $-0.1$ G is in the predetermined range of $tmin < t0 < tmax$, the sprung resonance is determined, and the duration time T of the sprung resonance is set to t0. Next, the cycle t is measured again at the start timing (b), and a half cycle (t1) from the start timing (b) to a timing (c) when the vertical acceleration exceeds $+0.1$ G is measured, so that the determination of the sprung resonance is carried out in the same manner as the case of t0. If the sprung resonance is determined, $T = t0 + t1$ is set. Similarly, subsequent half cycles t2, t3, . . . are measured, and $T = t0 + t1 + t2 + t3 \ldots$ is set during the generation of the sprung resonance. Finally, when the accumulated duration time T becomes greater than a set value T0, the damping force is set to a high level. If the cycle t does not satisfy the above condition of the sprung resonance, T is cleared. Next, at a timing when t satisfies the above condition of the sprung resonance, the cycle t is accumulated to obtain the time T.

Figure 5:
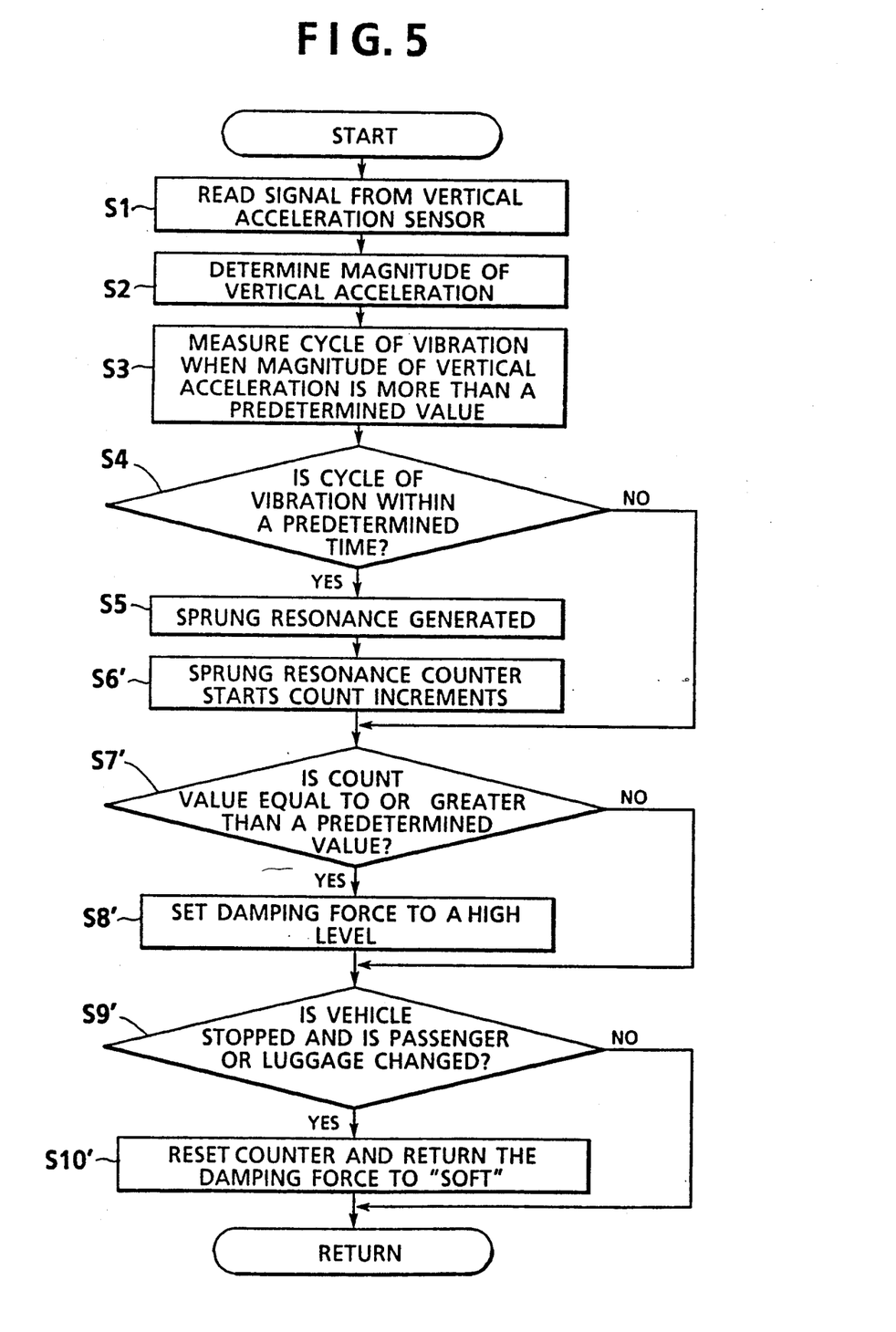
FIG. 5 is a flowchart showing the procedure of control operation by the control means according to a second preferred embodiment of the present invention.

FIG. 5 is a flowchart showing the procedure of control operation by the control means 7 according to a second preferred embodiment of the present invention. In the second preferred embodiment, the suspension control device is similar to the first preferred embodiment except the construction of the control means 7. That is, the control means 7 is designed to output to the damping force varying means 4 a command for varying the damping force to a desired value according to a magnitude of the vertical acceleration and a count value of the number of repetitions of vibration whose cycle is within a predetermined time, and a command for maintaining the damping force at a high level until a stoppage of the vehicle and a change in load such as passengers or luggage are estimated according to an output signal from the vehicle speed detecting means 5 and according to an output signal from the door open/closed condition detecting means 6.

The procedure of control operation by the control means 7 according to the second preferred embodiment will now be described with reference to the flowchart shown in FIG. 5.

First of all, it is assumed that the vehicle is cruising at a "SOFT" damping stage in consideration of the comfortability, and then after the program is started, a signal from the vertical acceleration sensor 2 is read in step S1, and a magnitude of the acceleration in vertical opposite directions which magnitude is equal to or greater than a predetermined level with reference to a reference value ($\pm 0$G (acceleration)) of the signal is detected in step S2.

Then in step S3, a cycle of the vibration is measured from a timing where the magnitude of the vertical acceleration is determined.

In step S4, it is judged whether or not the cycle of the vertical acceleration is within a predetermined range, that is, whether or not the sprung resonance is generated according to the results of steps S2 and S3. If the answer is YES, the program proceeds to step S5, and it is judged that the sprung resonance is generated, and then the program proceeds to step S6, in which a sprung resonance counter is incremented. Then, the program further proceeds to step S7', in which a count value of the counter is determined. If the count value is equal to or greater than a predetermined value, that is, if the number of repetitions of the sprung resonance is equal to or greater than a predetermined value, the program proceeds to step S8', in which a damping force is set to a high level. Then the program proceeds to step S9'.

Meanwhile, in the above step S4, if the answer is NO, then the program proceeds to step S7', in which the above processing is executed.

If it is judged in step S7' that the number of repetitions of the sprung resonance is less than the predetermined value, the program proceeds to step S9'.

In step S9', it is judged whether or not a load on the vehicle such as passengers or luggage is changed. That is, if the vehicle speed sensor 5 detects a zero speed to determine the stoppage of the vehicle and the door switch 6 detects a door open condition, it is judged that the passengers or luggage are changed, and the program proceeds to step S10'.

In step S10', the counter is reset, and the damping force is returned to an original value corresponding to the "SOFT" position if the damping force is currently maintained at the high level.

If the answer in step S9' is NO, that is, if no change in passenger or luggage occurs, the current condition is not changed, that is, the program skips the step S10 and proceeds to the next step.

Figure 7:
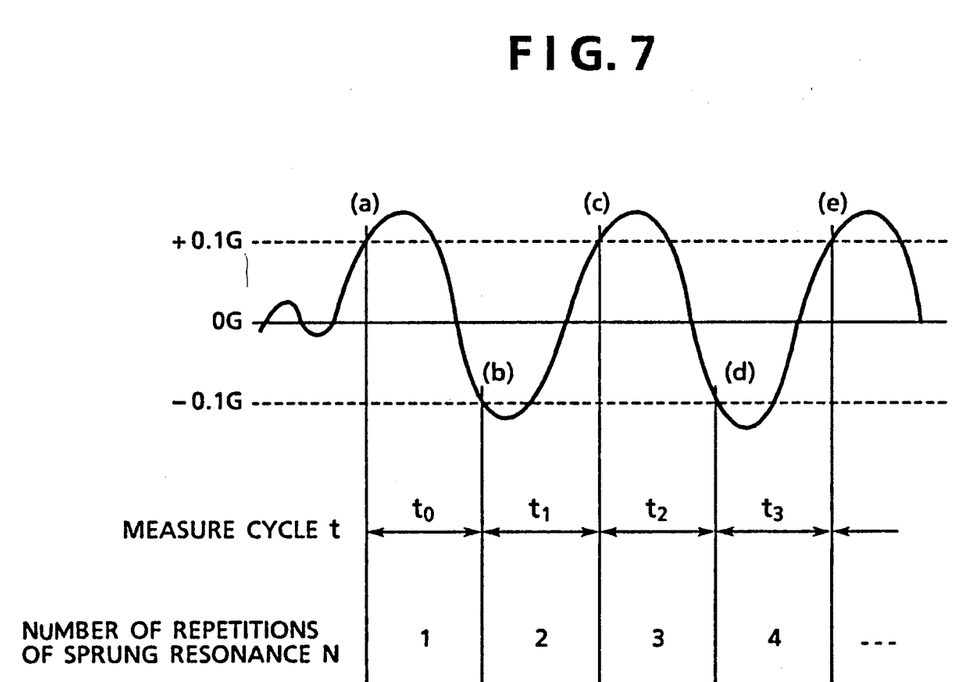
FIG. 7 is a characteristic graph showing an example of how to measure a cycle of vibration and detect the number of repetitions from a timing of the determination of the magnitude according to the second preferred embodiment as shown in FIG. 5.

The above procedures can be more clearly understood when explained in conjunction with FIG. 7.

In FIG. 7, the period t is measured at a start timing (a) when the vertical acceleration exceeds $+0.1$ G. If a half cycle (t0) from the start timing (a) to a timing (b) when the vertical acceleration exceeds $-0.1$ G. is in the predetermined range of $tmin < t0 < tmax$, the sprung resonance is determined, and the number of repetitions N of the sprung resonance is set to $N = 1$. Next, the cycle t is measured again at the start timing (b), and a half cycle (t1) from the start timing (b) to a timing (c) when the vertical acceleration exceeds +0.1 G is measured, so that the determination of the sprung resonance is carried out in the same manner as the case of t0. If the sprung resonance is determined, N is incremented by 1, and N=2 is set. Similarly, subsequent half cycles t2, t3, ... are measured, and N is incremented by 1 in each cycle during the generation of the sprung resonance. Finally, when the number of repetitions N becomes greater than a set value N0, the damping force is set to a high level. If the cycle t does not satisfy the above condition of the sprung resonance, N is cleared. Next, at a timing when t satisfies the above condition of the sprung resonance, the cycle t is accumulated to obtain the number of repetitions N.

The procedures taken in the control means 7 according to the preferred first and second embodiments are as above, however, the procedure can be taken in another method in which when the vertical acceleration sensor 2 detects a frequency close to the sprung resonance frequency, or when an accumulated duration time of the frequency close to the sprung resonance frequency becomes equal to or greater than a predetermined level, then the damping force of the suspension may be increased by one stage and maintain the same until the vehicle is stopped or the door is opened.

Further, the detection by the vertical acceleration 2 may be set to carry out when the vehicle speed is equal to or greater than a predetermined vehicle speed.

While the invention has been described with reference to specific embodiments, the description is illustrative and is not to be construed as limiting the scope of the invention.

Various modifications and changes may occur to those skilled in the art without departing from the spirit and scope of the invention as defined by the appended claims.

What is claimed is:

1. A suspension control device comprising:
   acceleration detecting means for detecting acceleration in vertically opposite directions of a vehicle body,
   a vehicle speed detecting means for detecting the vehicle's cruising speed,
   a door open/closed condition detecting means for detecting a door open/closed condition,
   a plurality of suspension means individually provided between corresponding wheels of a vehicle and said vehicle body for supporting said vehicle body on said corresponding wheels,
   damping force varying means for varying a damping force of said suspension means, and
   control means for controlling said damping force varying means so as to vary the damping force of said suspension means to an optimum value when a sprung resonance is detected and the accumulated duration time thereof is judged to be equal to or greater than a predetermined time by determining a magnitude of the vertical acceleration equal to or greater than a predetermined level with respect to a reference value of an output signal from said acceleration detecting means and measuring a cycle of vibration of said vehicle body from a timing when the magnitude of the vertical acceleration is determined to be equal to or greater than the predetermined level, wherein said control means maintains the damping force thereof until said vehicle speed detecting means detects a zero speed to determine a stoppage of the vehicle and said door open/closed condition detecting means detects a door open condition.

2. A suspension control device comprising:
   acceleration detecting means for detecting acceleration in vertically opposite directions of a vehicle body,
   a vehicle speed detecting means for detecting the vehicle's cruising speed,
   a door open/closed condition detecting means for detecting a door open/closed condition,
   a plurality of suspension means individually provided between corresponding wheels of a vehicle and said vehicle body for supporting said vehicle body on said corresponding wheels,
   damping force varying means for varying a damping force of said suspension means, and
   control means for controlling said damping force varying means so as to vary the damping force of said suspension means to an optimum value when a sprung resonance is detected and the number of repetitions thereof is judged to be equal to or greater than a predetermined value by determining a magnitude of the vertical acceleration equal to or greater than a predetermined level with respect to a reference value of an output signal from said acceleration detecting means and measuring a cycle of vibration of said vehicle body from a timing when the magnitude of the vertical acceleration is determined to be equal to or greater than the predetermined level, wherein said control means maintains the damping force thereof until said vehicle speed detecting means detects a zero speed to determine a stoppage of the vehicle and said door open/closed condition detecting means detects a door open condition.

* * * * *